United States Patent
Janzen et al.

(10) Patent No.: US 10,814,758 B2
(45) Date of Patent: Oct. 27, 2020

(54) VEHICLE SEAT FOR A MOTOR VEHICLE WITH SEAT CUSHION RETENTION

(71) Applicant: Ford Global Technologies, LLC, Dearborn, MI (US)

(72) Inventors: Michael Janzen, Cologne (DE); Matthias Hetz, Cologne (DE); Thorsten Klein-Hitpass, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/406,219

(22) Filed: May 8, 2019

(65) Prior Publication Data
US 2019/0344693 A1 Nov. 14, 2019

(30) Foreign Application Priority Data

May 9, 2018 (DE) .......................... 10 2018 207 272

(51) Int. Cl.
*B60N 2/70* (2006.01)
*B60N 2/68* (2006.01)
*B29C 44/12* (2006.01)
*B60N 2/28* (2006.01)

(52) U.S. Cl.
CPC ............ *B60N 2/682* (2013.01); *B60N 2/68* (2013.01); *B60N 2/2893* (2013.01); *B60N 2002/684* (2013.01)

(58) Field of Classification Search
CPC ........ B60N 2/7017; B60N 2/68; B60N 2/015; B60N 2/682; B60N 2/5825
See application file for complete search history.

(56) References Cited

U.S. PATENT DOCUMENTS

| | | | | |
|---|---|---|---|---|
| 10,166,892 B2* | 1/2019 | Mochizuki | ............... | B60N 2/64 |
| 10,414,309 B2* | 9/2019 | Noro | ...................... | A47C 7/185 |
| 10,631,650 B2* | 4/2020 | Hashimoto | ............ | A47C 27/14 |
| 10,682,939 B2* | 6/2020 | Araki | ....................... | B60N 2/70 |
| 2010/0133891 A1* | 6/2010 | Onoda | ................. | B60N 2/7017 297/452.48 |
| 2013/0015694 A1* | 1/2013 | Tosco | ..................... | B60N 2/686 297/452.18 |
| 2016/0101714 A1* | 4/2016 | Szlag | ................... | B60N 2/2893 297/239 |
| 2017/0259719 A1* | 9/2017 | Hamano | ................ | B60N 2/682 |
| 2018/0368578 A1* | 12/2018 | Takayama | ................ | B60N 2/68 |
| 2019/0217759 A1* | 7/2019 | Sakakibara | ............. | B29C 39/10 |

FOREIGN PATENT DOCUMENTS

DE 102006007374 A1 8/2007

* cited by examiner

*Primary Examiner* — Shin H Kim
(74) *Attorney, Agent, or Firm* — David Coppiellie; Price Heneveld LLP

(57) ABSTRACT

A vehicle seat for a motor vehicle, comprising a seat part with a seat cushion which provides a seat surface and which comprises a front seat portion and a rear seat portion extending diametrically thereto, and a backrest with a lower backrest portion and an upper backrest portion extending diametrically thereto. The lower backrest portion of the backrest is arranged adjacent to the rear seat portion of the seat cushion. At least one locking tab is provided that holds the rear seat portion of the seat cushion on the lower backrest portion of the backrest relative to at least one spatial direction extending substantially perpendicular to the seat surface in the direction of the upper backrest portion.

20 Claims, 4 Drawing Sheets

VEHICLE SEAT FOR A MOTOR VEHICLE WITH SEAT CUSHION RETENTION

FIELD OF THE INVENTION

The present invention generally relates to a vehicle seat for a motor vehicle, and more particularly relates to a vehicle seat for a passenger motor vehicle which comprises a seat base part with a seat cushion which provides a seat surface and a backrest.

BACKGROUND OF THE INVENTION

Passenger vehicle seats are generally known in many different configurations. Generally, the seat base part and/or the backrest of a seat in a motor vehicle are fastenable to a vehicle structure and/or a vehicle body of the motor vehicle. The seat fastening typically is designed such that it securely and fixedly anchors the vehicle seat to the vehicle body. However, in standardized tests for assessing the robustness of vehicle seats and the anchorings thereof, it has been shown that the unloaded seat base part and, in particular, the unloaded seat cushion may be at least partially released and folded upwardly. Such behavior of the vehicle seat is not desirable and should be avoided.

In view of this background, it would be desirable to provide an improved vehicle seat that prevents release of the seat cushion and that is intended to be able to be assembled in a motor vehicle in a simple manner and without additional cost.

SUMMARY OF THE INVENTION

According to one aspect of the present invention, a vehicle seat for a motor vehicle is provided. The vehicle seat for a motor vehicle includes a seat base part with a seat cushion which provides a seat surface and which comprises a front seat portion and a rear seat portion extending diametrically thereto, a backrest with a lower backrest portion and an upper backrest portion extending diametrically thereto, wherein the lower backrest portion of the backrest is arranged adjacent to the rear seat portion of the seat cushion, and at least one locking tab holding the rear seat portion of the seat cushion on the lower backrest portion of the backrest relative to at least one spatial direction extending substantially perpendicular to the seat surface in a direction of the upper backrest portion.

According to another aspect of the present invention, a vehicle seat is provided. The vehicle seat includes a seat base part with a seat cushion which provides a seat surface and which comprises a front seat portion and a rear seat portion, a backrest with a lower backrest portion and an upper backrest portion, wherein the lower backrest portion of the backrest is arranged adjacent to the rear seat portion of the seat cushion, and a locking tab holding the rear seat portion of the seat cushion on the lower backrest portion of the backrest.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
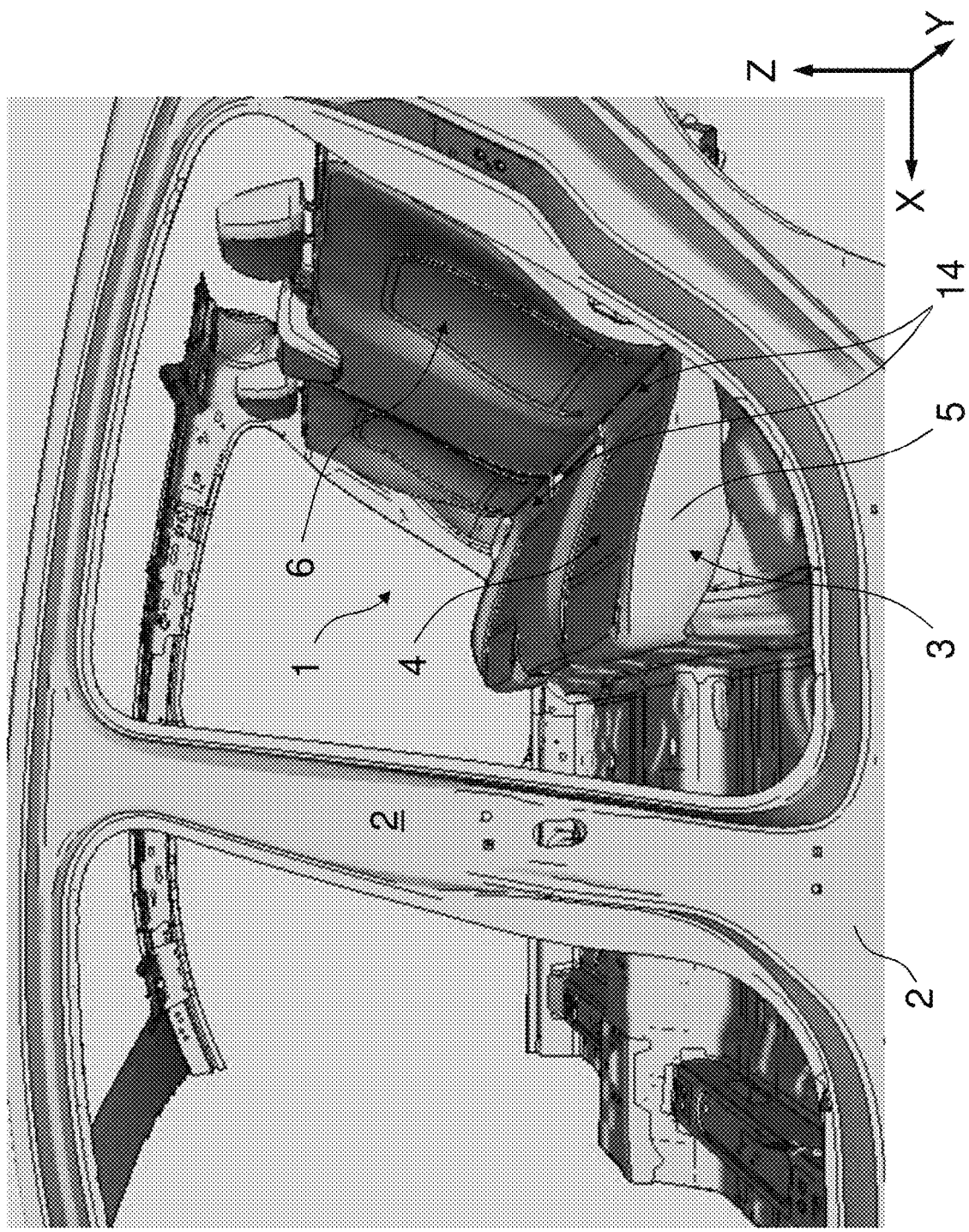
FIG. 1 is a perspective side view of an exemplary embodiment of a portion of a passenger motor vehicle having one or more vehicle seats.

In the various figures, parts which are equivalent in terms of function are always provided with the same reference numerals so that these parts are generally only described once.

FIG. 1 shows schematically a perspective side view of an exemplary embodiment of a passenger compartment of a passenger motor vehicle having one or more vehicle seats 1. The motor vehicle, which is not fully shown, has a part of a vehicle structure and/or a vehicle body 2 thereof being able to be identified. As may be derived from FIG. 1, the vehicle seat 1 has a seat base part 3 with a seat cushion 5 providing a seat surface 4. Moreover, the vehicle seat 1 has a backrest 6.

Figure 2:
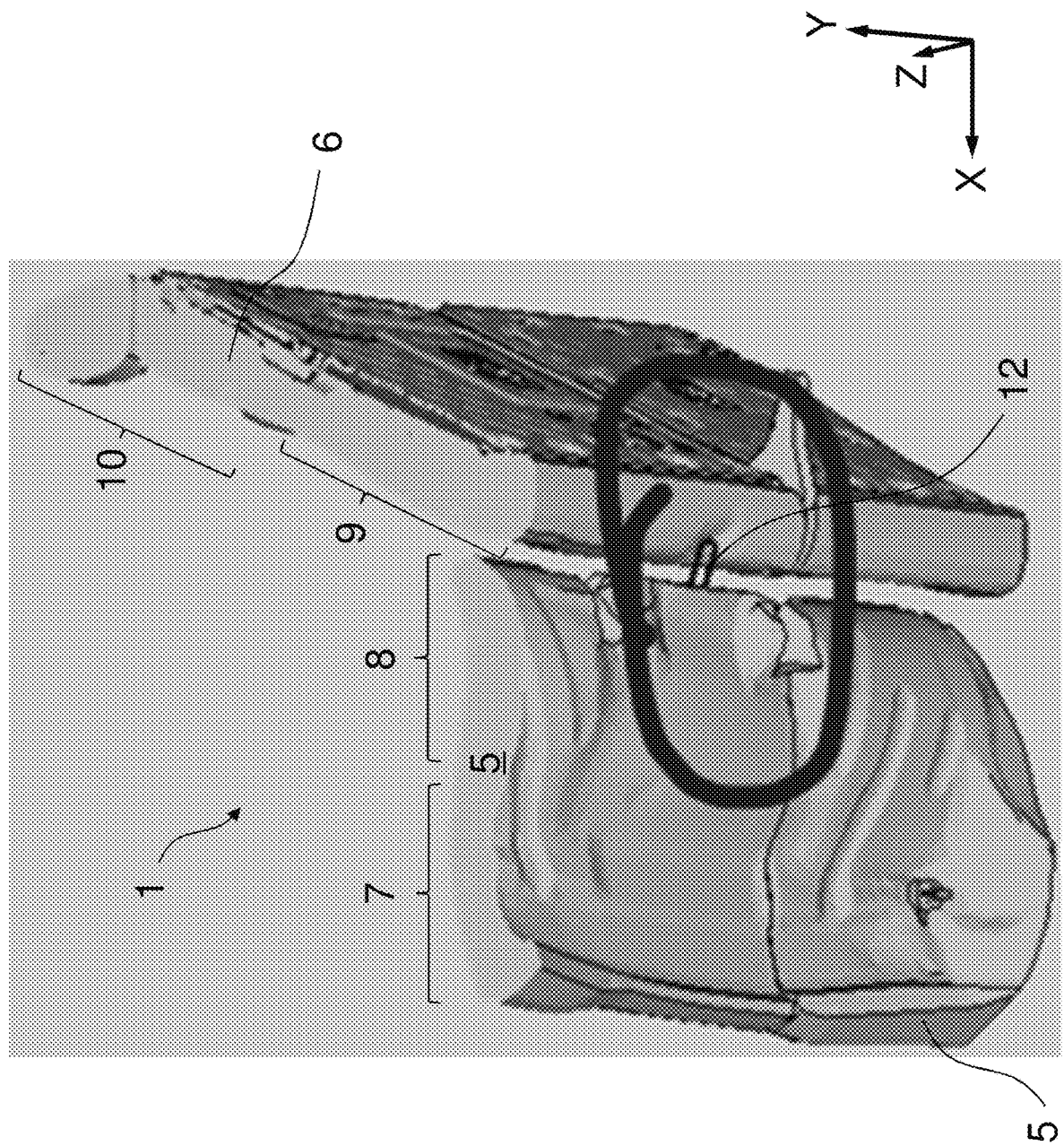
FIG. 2 is a perspective bottom view of a part of a vehicle seat shown in FIG. 1 having a locking tab, according to one embodiment.

As is made clear in FIG. 2 which shows a perspective bottom view of a part of the vehicle seat 1 of FIG. 1, the seat cushion 5 has a front seat portion 7 and a rear seat portion 8 extending diametrically thereto. Moreover, the backrest 6 has a lower backrest portion 9 and an upper backrest portion 10 extending diametrically thereto. It may also be derived from FIGS. 1 and 2 that the lower backrest portion 9 of the backrest 6 is arranged adjacent to the rear seat portion 8 of the seat cushion 5. The backrest 6 may be pivotably mounted about a pivot axis (not shown) arranged in the region of its lower backrest portion 9 in a manner known per se, e.g., substantially foldable onto the seat surface 4 of the seat cushion 5. This is, however, not absolutely necessary according to other embodiments.

Figure 3:
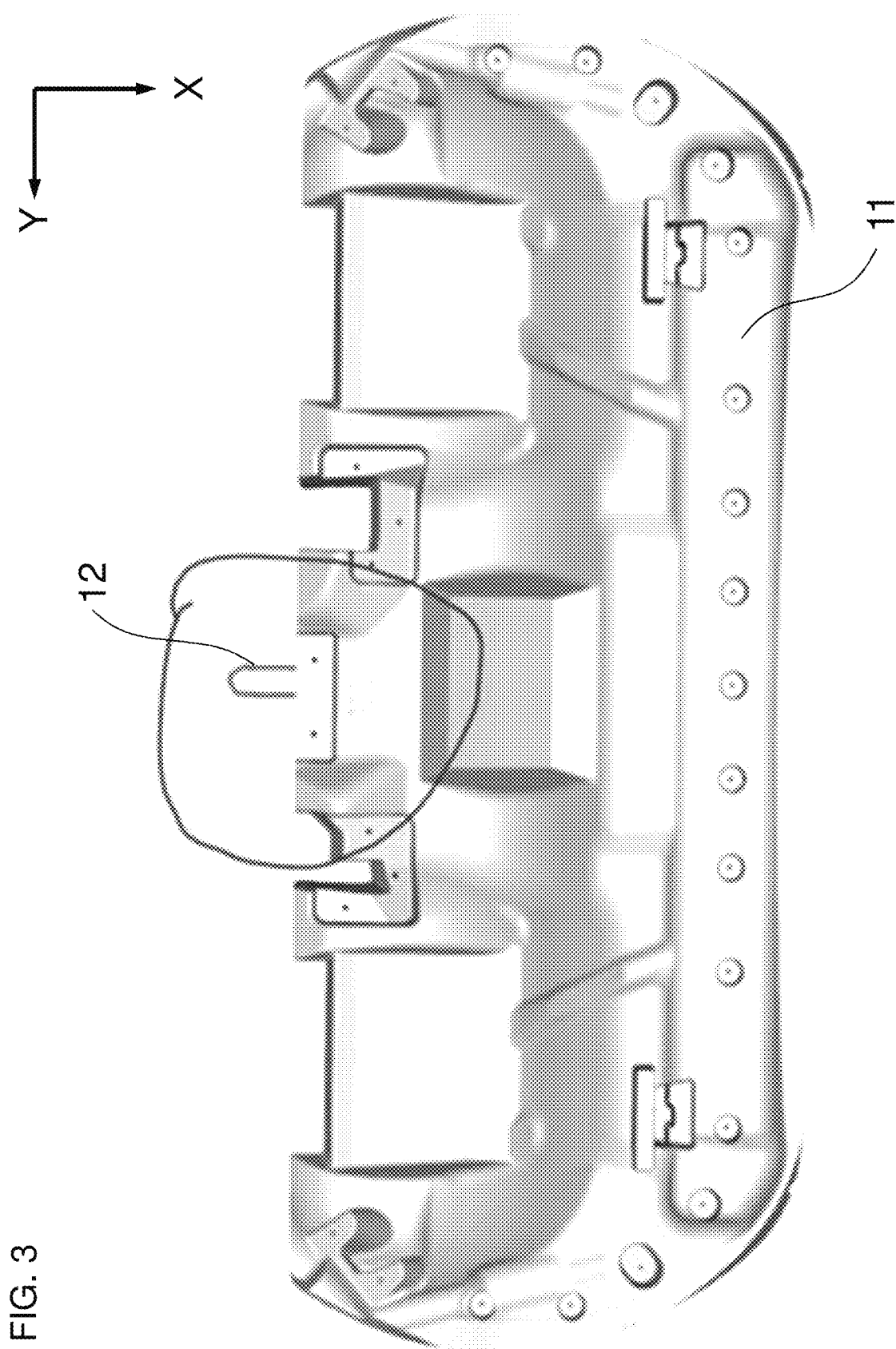
FIG. 3 is a bottom plan view of a part of the vehicle seat having the locking tab shown in FIG. 2.

FIG. 3 shows a bottom plan view of a part of the vehicle seat 1 of FIG. 1. The lower face of a seat pan 11 may be seen in this view, the seat cushion 5 (FIG. 2) being able to be arranged thereon and being able to be connected thereto so that the seat BASE part 3 (FIG. 1) and/or the vehicle seat 1 is fastenable in the motor vehicle and/or on the vehicle structure 2 thereof in a manner known per se.

In FIG. 2 the vehicle seat 1 is shown without the seat pan 11 and a locking tab 12 is illustrated. The locking tab is shown holding and/or fixing the rear seat portion 8 of the seat cushion 5 on the lower backrest portion 9 of the backrest 6 relative to a spatial direction Z extending substantially perpendicular to the seat surface 4 (FIG. 1) in the direction of the upper backrest portion 10.

As may be derived from FIG. 2, in the exemplary embodiment of the vehicle seat 1 shown, the locking tab 12 is of annular configuration. Moreover, the locking tab 12 is configured to be substantially flexurally rigid and produced from a metal material according to one embodiment. The connecting locking tab 12, however, could also be configured over the entire surface according to other embodiments. Moreover, it may be identified in FIG. 2 that in the vehicle seat 1 shown a single locking tab 12 is provided, the locking tab 12 being arranged centrally relative to a transverse direction of extent Y of the seat cushion 5 and/or seat base part 3 (FIG. 1).

The central arrangement of the locking tab 12 relative to the transverse direction of extent Y of the seat part 3 (FIG. 1) is clearly illustrated in FIG. 3, wherein the seat pan 11 shown therein extends substantially over the entire width (transverse extent Y) of the seat cushion 5 and/or seat base part 3. At this point it should be mentioned that in the exemplary embodiment of the vehicle seat 1 shown herein the locking tab 12 is not connected straight/directly to the seat pan 11 and/or fastened thereto but merely connected via the seat cushion 5 which is connected to the seat pan 11.

In particular, the locking tab 12 of the vehicle seat 1, as is shown in FIG. 2 among other things, is fixedly connected at one end to the seat cushion 5 and extends at the other end freely relative to the lower backrest portion 9 of the backrest 6. In this embodiment, the locking tab 12 in the vehicle seat 1 shown extends at least partially below the lower backrest portion 9 of the backrest 6 adjoining the rear seat portion 8 of the seat cushion 5. The overlapping length of the locking tab 12 and the lower face of the lower backrest portion 9 may preferably be approximately half of the backrest thickness (which corresponds substantially to the thickness of the backrest 6 in the direction of extent X). This is, however, not absolutely necessary. A shorter or longer overlapping length may also be provided.

Figure 4:
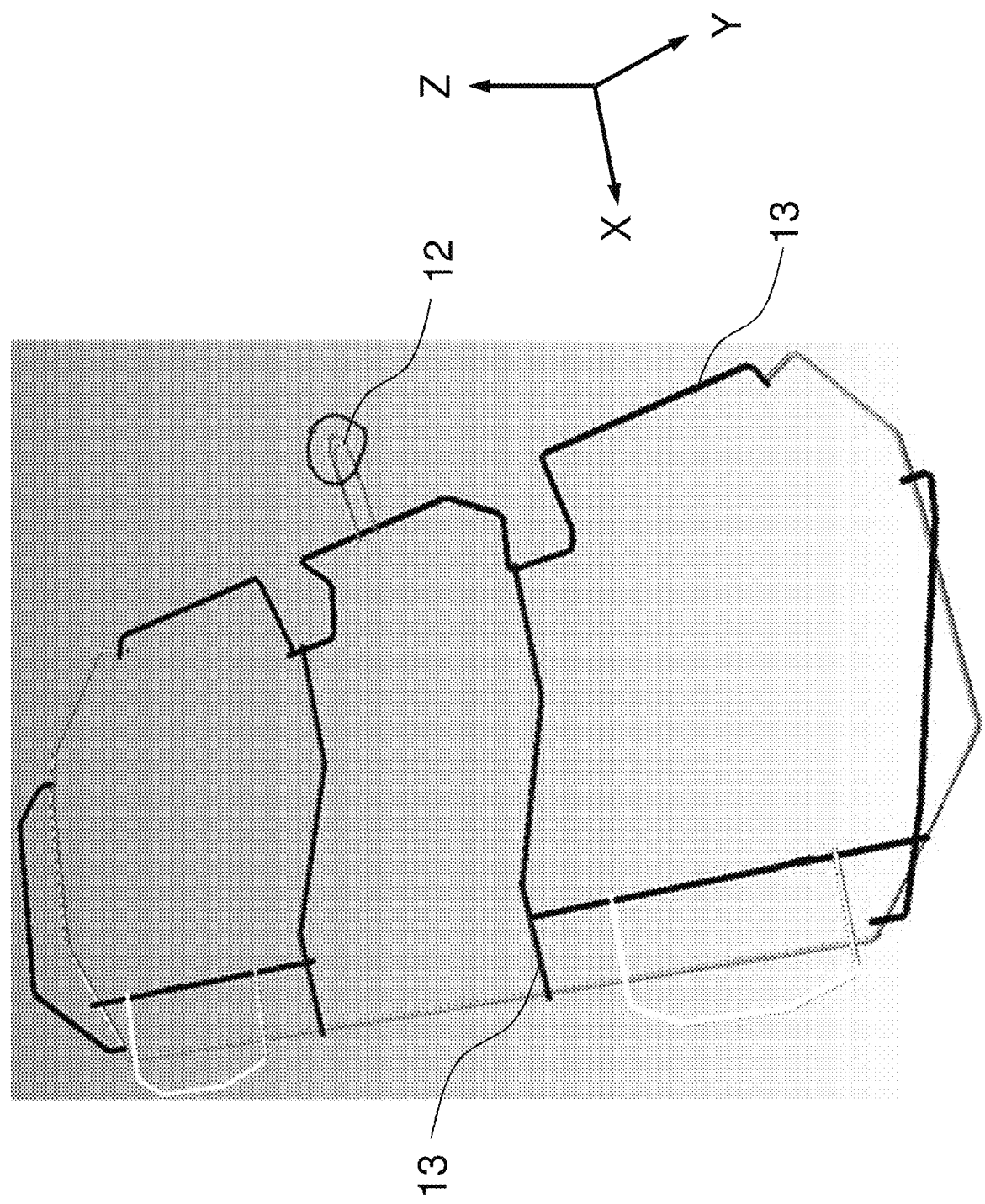
FIG. 4 is a perspective view of a wire frame received in a seat cushion of the vehicle seat shown in FIG. 1.

In FIG. 4, which shows a perspective view of a wire frame 13 received in the seat cushion 5 of the vehicle seat 1 of FIG. 1, the locking tab 12 of the vehicle seat 1 is illustrated fixedly connected to the wire frame 13. Since the wire frame 13 and the locking tab 12 in the exemplary embodiment shown here are formed from a metal material, the wire frame 13 and the locking tab 12 may be connected together by a material connection, such as for example by welding. Other connection techniques, for example adhesive bonding, screwing, clamping and the like are also conceivable.

The wire frame 13 shown in FIG. 4 is received in the seat cushion 5 of the vehicle seat 1, in particular enclosed by the cushion foam forming the seat cushion 5, e.g., foamed therein. Thus the locking tab 12 is held positively via the wire frame 13 in the seat cushion 5 and the locking tab 12 relative to the at least one spatial direction Z (blocking direction) forms a positive operative engagement with the lower backrest portion 9 of the backrest 6 so that the seat cushion 5 is held and/or fixed to the lower backrest portion 9 of the backrest 6 in the spatial direction Z, at least in the direction of the upper backrest portion 10.

Moreover, in the exemplary embodiment of the vehicle seat 1 shown in FIG. 1 an Isofix fastening device 14, which is known per se, is illustrated in the region of the vehicle seat 1 in which the rear seat portion 8 of the seat cushion 5 adjoins the lower backrest portion 9 of the backrest 6.

The above-described vehicle seat for a motor vehicle, in particular a passenger motor vehicle, is not limited to the embodiments disclosed herein but also encompasses further similar or equivalent embodiments which are produced from further technically expedient combinations of the features described herein. In particular, the locking tab does not have to be arranged below the lower backrest portion of the backrest, so as to bear there against, as shown in the above exemplary embodiment. Instead, the locking tab could also be arranged in a recess configured on the lower backrest portion of the backrest. This recess could, for example, be fully closed around the periphery, apart from an opening through which a free end of the locking tab might be inserted into the recess, so that in this embodiment the locking tab could simultaneously fix the seat cushion to the backrest in a plurality of spatial and/or blocking directions, for example upwardly and downwardly in the vertical direction of extent of the vehicle seat and to the left and right in its transverse direction of extent.

It should be mentioned that the features set forth individually in the description may be combined with one another in any technically expedient manner and disclose further embodiments of the vehicle seat. The description characterizes and specifies the vehicle seat, in particular, additionally in combination with the figures.

Moreover, it should be mentioned that a conjunction "and/or", which is used herein and hereinafter between two features and which links these features together, always has to be interpreted such that only the first feature may be present in a first embodiment of the subject according to the disclosure, only the second feature may be present in a second embodiment and both the first and the second feature may be present in a third embodiment.

According to the disclosure, a vehicle seat for a motor vehicle, in particular for a passenger motor vehicle, comprises a seat base part with a seat cushion which provides a seat surface and a backrest. The seat cushion comprises a front seat portion and a rear seat portion extending diametrically thereto, which substantially determine the seat surface. The backrest comprises a lower backrest portion and an upper backrest portion extending diametrically thereto, which substantially determine the backrest bearing surface of a person seated on the vehicle seat. Moreover, the lower backrest portion of the backrest is arranged adjacent to the rear seat portion of the seat cushion.

It should be understood that the seat base part and/or the backrest of the vehicle seat in a vehicle, in particular a motor vehicle, such as for example a passenger motor vehicle, is fastenable to a vehicle structure and/or a vehicle body. In this case, the seat base part may comprise a seat pan which is made from, for example, metal or plastics material, the seat cushion being received therein and fastened thereto. Finally, the seat base part of the vehicle seat may be securely fastened in the vehicle via the seat pan.

According to the disclosure, at least one locking tab is also provided, the locking tab holding the rear seat portion of the seat cushion on the lower backrest portion of the backrest relative to at least one spatial direction extending substantially perpendicular to the seat surface in the direction of the upper backrest portion. In other words, the locking tab is configured and arranged to block and thus to prevent a movement of the seat cushion and/or its rear seat portion in the at least one spatial direction specified above (also denoted herein as the blocking direction) relative to the backrest and/or the lower backrest portion thereof, i.e., to fix the seat cushion to the backrest relative to the blocking direction. Thus, even if it were to become (partially) released, for example, from a seat pan of the vehicle seat or generally from its anchoring on a vehicle structure and/or a vehicle body due to the high acceleration forces acting thereon, the unloaded seat cushion would not be able to move in the aforementioned spatial direction and/or blocking direction, such as substantially parallel to the backrest in the direction of the upper backrest portion, since it is held by the locking tab on the lower backrest portion of the backrest.

It should be mentioned that, depending on its practical embodiment and/or arrangement, the at least one locking tab may also hold the seat cushion on the lower backrest portion of the backrest in further spatial directions, in addition to the at least one spatial direction specified above. If the at least one spatial direction specified above corresponds to an upwardly facing three-dimensional spatial direction, additionally a movement of the seat cushion and/or its rear seat portion relative to the backrest and/or its lower backrest portion downwardly, to the front, to the rear, to the left and/or right, may also be prevented by the at least one locking tab. The spatial directions "up" and "down" correspond to a vertical direction of extent of the vehicle seat, "front" and "rear" correspond to a longitudinal direction of extent of the vehicle seat, and "left" and "right" correspond to a transverse direction of extent of the vehicle seat.

According to an advantageous development of the disclosure, relative to the at least one spatial direction and/or blocking direction specified above, the at least one locking tab forms a positive operative engagement with the lower backrest portion of the backrest and/or with the rear seat portion of the seat cushion. The positive operative engagement, in particular, provides the advantage that by use of the locking tab a rigid connection (for example a material connection) does not have to be produced between the seat cushion and the backrest which, for example, permits simpler assembly of the seat base part and the backrest of the vehicle seat, since the positive connection between the rear seat portion of the seat cushion and the lower backrest portion of the backrest is advantageously formed only by the arrangement of the backrest on the seat part. Furthermore, the positive operative engagement permits an advantageous compensation of tolerances in the arrangement of the seat cushion and backrest.

According to a further advantageous embodiment, the locking tab is fixedly connected at one end to the seat cushion and at the other end extends freely relative to the lower backrest portion of the backrest. In other words, relative to a contour surface substantially defining and enclosing the seat cushion, the locking tab protrudes out of the contour surface. The fixed connection of the locking tab to the seat cushion may be implemented by a positive, frictional or material connection. The locking tab in this embodiment is not fixedly connected to the backrest and/or its lower backrest portion. The connection holding the seat cushion and/or its rear seat portion on the backrest and/or its lower backrest portion in the at least one blocking direction provided by the locking tab is advantageously effected only by the arrangement of the backrest on the seat base part, whereby an assembly of the vehicle seat itself and its assembly in a vehicle are simplified.

According to a further particularly preferred embodiment of the disclosure, the locking tab is fixedly connected to a wire frame which is at least partially enclosed by the seat cushion. The connection between the locking tab and the wire frame may be implemented, for example, by a material connection, while the wire frame and the locking tab are held by a positive connection, for example, by being at least partially foamed into a cushion foam of the seat cushion. Preferably the wire frame may be formed from metal. While the seat part may comprise a seat pan as described above, the wire frame is preferably not directly connected to the seat pan. The locking tab alone ensures the fixing of the seat cushion to the backrest in the at least one blocking direction according to the manner described herein.

For a fixing of the seat cushion and/or its rear seat portion to the backrest and/or its lower backrest portion to be implemented in a simple manner in the at least one blocking direction specified above, according to an advantageous further embodiment, the locking tab extends at least partially below the lower backrest portion of the backrest, adjacent to the rear seat portion of the seat cushion. If the locking tab is fixedly attached to the seat cushion, as for example is described above, its movement in the at least one blocking direction, specified above, e.g., in the direction from the lower backrest portion to the upper backrest portion of the backrest, is blocked by the locking tab. The backrest and/or its lower backrest portion thus do not have to have any special device for receiving or mounting the locking tab. Instead, the backrest may be configured and produced as a whole in the conventional manner.

Further, the locking tab may be configured to be substantially flexurally rigid (stiff), in particular in the direction of the at least one blocking direction, which ensures a sufficient transmission of force, in particular with regard to acceleration forces that may occur between the backrest and the seat cushion and thus a secure fixing of the seat cushion to the backrest in the blocking direction.

In one embodiment, the locking tab may be formed from a metal material, for example steel, aluminum and the like, or a plastics material, for example from a thermosetting plastics material.

The locking tab may also be configured as a substantially planar tab or tongue. The shape of its periphery may be angular, for example rectangular, triangular, trapezoidal, etc. or rounded, for example oval, circular, arcuate, etc.

A part of the locking tab protruding from a contour surface of the seat cushion, in an arrangement and extent as far as below the lower backrest portion of the backrest, for example, may have a length which approximately corresponds to half of the thickness of the backrest, for example approximately 10 cm. A width of the locking tab may, for example, correspond to approximately half of its length, accordingly in the above example approximately 5 cm, for example.

According to an even further advantageous embodiment, the locking tab is of annular configuration. The locking tab thus may also be used as a circular, arcuate or elliptical eye into which, for example, an additional securing hook may be engaged. Additionally, the annular shape of the locking tab may further permit a saving in terms of weight and material.

In one embodiment, a single locking tab may be provided on the vehicle seat, the locking tab thus being arranged substantially centrally relative to a transverse direction of extent of the seat part. This embodiment also advantageously permits a saving in terms of weight and material and ensures at the same time a secure fixing of the seat cushion to the backrest in the desired blocking direction.

An even further advantageous embodiment of the vehicle seat provides that the backrest is pivotably held relative to the seat part. In other words, the backrest is able to be folded down, wherein the pivot axis may be arranged, for example, in the region of the lower backrest portion of the backrest and/or the rear seat portion of the seat cushion. Particularly advantageously, the pivoting of the backrest is not hindered by the connection between the seat cushion and the backrest (fixing in the blocking direction) provided by the locking tab on the vehicle seat according to this embodiment.

An even further advantageous embodiment of the vehicle provides that an Isofix fastening device for a child seat is arranged in the region in which the lower backrest portion of the backrest adjoins the rear seat portion of the seat cushion. The connection described herein, which is provided by the locking tab and which fixes the seat cushion to the backrest in the at least one blocking direction, permits the cushion of the backrest and/or the seat cushion to be designed with regard to its thickness in the region of the Isofix fastening device such that, on the one hand, a sufficient seating comfort may be achieved but, on the other hand, an easily accessible operation of the Isofix fastening device is also possible.

The vehicle seat according to one embodiment may be a rear seat which in turn may be configured as a rear seat bench on which at least two people may be seated adjacent to one another.

In one embodiment, the vehicle seat according to the disclosure is particularly useful as a rear seat in a motor vehicle, in particular in a passenger motor vehicle.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat for a motor vehicle, comprising:
    a seat base part with a seat pan and a seat cushion which provides a seat surface and which comprises a front seat portion and a rear seat portion extending diametrically thereto, wherein the seat cushion is arranged on the seat pan;
    a backrest with a lower backrest portion and an upper backrest portion extending diametrically thereto, wherein the lower backrest portion of the backrest is arranged adjacent to the rear seat portion of the seat cushion; and
    at least one locking tab directly fixed to the seat cushion and holding the rear seat portion of the seat cushion on the lower backrest portion of the backrest relative to at least one spatial direction extending substantially perpendicular to the seat surface in a direction of the upper backrest portion.

2. The vehicle seat as claimed in claim 1, wherein relative to the at least one spatial direction the locking tab forms a positive operative engagement with the lower backrest portion of the backrest and/or with the rear seat portion of the seat cushion.

3. The vehicle seat as claimed in claim 1, wherein the at least one locking tab is fixedly connected at one end to the seat cushion and at the other end extends freely relative to the lower backrest portion of the backrest.

4. The vehicle seat as claimed in claim 1, wherein the at least one locking tab is fixedly connected to a wire frame which is at least partially enclosed by the seat cushion.

5. The vehicle seat as claimed in claim 1, wherein the at least one locking tab extends at least partially below the lower backrest portion of the backrest, adjacent to the rear seat portion of the seat cushion.

6. The vehicle seat as claimed in claim 1, wherein each of the at least one locking tabs is configured to be flexurally rigid.

7. The vehicle seat as claimed in claim 1, wherein each of the at least one locking tabs is of annular configuration.

8. The vehicle seat as claimed in claim 1, wherein the at least one locking tab comprises a single locking tab arranged substantially centrally relative to a transverse direction of extent of the seat base part.

9. The vehicle seat as claimed in claim 1 further comprising an Isofix fastening device for a child seat is seat arranged in the region in which the lower backrest portion of the backrest adjoins the rear seat portion of the seat cushion.

10. The vehicle seat as claimed in claim 1, wherein the vehicle seat is a vehicle rear seat.

11. A vehicle seat, comprising:
    a seat base part with a seat pan and a seat cushion which provides a seat surface and which comprises a front seat portion and a rear seat portion, wherein the seat cushion is arranged on the seat pan;
    a backrest with a lower backrest portion and an upper backrest portion, wherein the lower backrest portion of the backrest is arranged adjacent to the rear seat portion of the seat cushion; and
    a locking tab directly fixed to the seat cushion and holding the rear seat portion of the seat cushion on the lower backrest portion of the backrest.

12. The vehicle seat as claimed in claim 11, wherein the locking tab holds the rear seat portion of the seat cushion on the lower backrest portion of the backrest relative to at least one spatial direction extending substantially perpendicular to the seat surface in a direction of the upper backrest portion, and wherein relative to the at least one spatial direction the locking tab forms a positive operative engagement with the lower backrest portion of the backrest and/or with the rear seat portion of the seat cushion.

13. The vehicle seat as claimed in claim 11, wherein the locking tab is fixedly connected at one end to the seat cushion and at the other end extends freely relative to the lower backrest portion of the backrest.

14. The vehicle seat as claimed in claim 11, wherein the locking tab is fixedly connected to a wire frame which is at least partially enclosed by the seat cushion.

15. The vehicle seat as claimed in claim 11, wherein the locking tab extends at least partially below the lower backrest portion of the backrest, adjacent to the rear seat portion of the seat cushion.

16. The vehicle seat as claimed in claim 11, wherein the locking tab is configured to be flexurally rigid.

17. The vehicle seat as claimed in claim 11, wherein the locking tab is of annular configuration.

18. The vehicle seat as claimed in claim 11, wherein the locking tab is arranged substantially centrally relative to a transverse direction of extent of the seat part.

19. The vehicle seat as claimed in claim 11 further comprising an Isofix fastening device for a child seat is arranged in the region in which the lower backrest portion of the backrest adjoins the rear seat base portion of the seat cushion.

20. The vehicle seat as claimed in claim 11, wherein the vehicle seat is a vehicle rear seat.

* * * * *